United States Patent [19]

Koai

[11] Patent Number: 4,932,735

[45] Date of Patent: Jun. 12, 1990

[54] INTEGRATED OPTICAL HYBRID MATRIX SWITCHES WITH VERY LOW CROSSTALK

[75] Inventor: Kwang T. Koai, Acton, Mass.

[73] Assignee: GTE Laboratories Incorporated, Waltham, Mass.

[21] Appl. No.: 414,980

[22] Filed: Sep. 29, 1989

[51] Int. Cl.$^5$ ............................ G02B 6/10; G02B 6/36
[52] U.S. Cl. ............................ 350/96.13; 350/96.20
[58] Field of Search ............... 350/96.10, 96.12, 96.13, 350/96.14, 96.15, 96.20

[56] References Cited

U.S. PATENT DOCUMENTS

| | | | |
|---|---|---|---|
| 4,011,543 | 3/1977 | Soref et al. | 350/96.13 |
| 4,618,210 | 10/1986 | Kondo | 350/96.14 |
| 4,773,721 | 9/1988 | Erman et al. | 350/96.14 X |
| 4,787,692 | 11/1988 | Spanke | 350/96.14 X |
| 4,811,210 | 3/1989 | McAulay | 350/96.13 X |
| 4,822,124 | 4/1989 | Suzuki | 350/96.14 X |
| 4,852,958 | 8/1989 | Okuyama et al. | 350/96.13 |
| 4,865,408 | 9/1989 | Korotky | 350/96.13 |
| 4,883,334 | 11/1989 | Chiarulli et al. | 350/96.13 |

OTHER PUBLICATIONS

R. C. Alferness, "Waveguide Electrooptic Switch Arrays", IEEE J. Selected Areas in Commun., vol. 6, 1117-1130 (1980).

I. Sawaki et al., "Rectangularly Configured 4×4 Ti:-LiNbO3 Matrix Switch with Low Drive Voltage",-, 1267-1272 (1988).

Primary Examiner—William L. Sikes
Assistant Examiner—Akm E. Ullah
Attorney, Agent, or Firm—Victor F. Lohmann, III; James J. Cannon, Jr.

[57] ABSTRACT

A hybrid design for rectangularly configured integrated optical matrix switches uses both 2×2 optical changeover switches and 2×2 optical shift switches to achieve significant reduction of crosstalk accumulation for a strictly nonblocking switch architecture. The 2×2 optical shift switches are novel two-stage switches which allow two connection paths to bypass each other with very little crosstalk in the crossover state. A crossbar matrix switch uses 2n 2×2 optical changeover switches in the outer stages and $n^2-2n$ optical shift switches in the intermediate stages.

11 Claims, 4 Drawing Sheets

INTEGRATED OPTICAL HYBRID MATRIX SWITCHES WITH VERY LOW CROSSTALK

BACKGROUND OF THE INVENTION

This invention relates generally to the field of integrated optical components for use in fiber optic communications, and more specifically to photonic switching. In particular, it pertains to integrated optical crossbar matrix switches having very low crosstalk.

An optical 2×2 changeover switch with two input ports and two output ports has two operational states. In a first state, known as the "bar" state, the switch is activated by applying a voltage to its electrodes, and an optical signal on a first input port passes straight through to the first output port. In a second state, known as the "cross" or "changeover" state, an optical signal on a first input port crosses from one waveguide to another to appear on a second output port, as illustrated in FIGS. 1a and 1b. Typical 2×2 optical changeover switches are directional couplers, $\Delta\beta$ directional couplers and X-switches. Electrooptic 2×2 changeover switches have been extensively used to build optical crossbar matrix switches ever since photonic switching was first explored. Alferness ("Waveguide electrooptic switch arrays", IEEE J. Selected Areas in Commun., Vol. 6, pp. 1117-1130 (1988)) has given a review of the status of waveguide electrooptic switch arrays.

The rectangularly configured crossbar matrix switch was reported by Sawaki et al. (Rectangularly configured 4×4 Ti=LiNbO3 matrix switch with low drive voltage", IEEE J. Selected Areas in Commun., Vol. 6, pp. 1267-1272 (1988)).

FIG. 2 is a diagram of such a 4×4 rectangular crossbar matrix switch 120 using 2×2 changeover switch elements 122 (represented by boxes in FIG. 2), such as reverse $\Delta\beta$ directional couplers. The 2×2 changeover switch elements are connected by passive integrated waveguide bends 124 (thick grey lines). The diagram of FIG. 2 also shows four input ports A, B, C, D, and four output ports A', B', C', D'. FIG. 2 also indicates which switch elements 122 should be activated (driven to the "bar" state) to set up corresponding connection paths. Under each switch element 122 are two-letter codes which indicate the connection path which results from activating that particular switch element. For example, activating the upper-left switch element (code AC') in FIG. 2 connects port A to port C'. This representational technique for connection paths is utilized in subsequent figures. In FIG. 2 and subsequent figures, some integrated waveguide bends are omitted for clarity in the drawings.

FIG. 3 shows a diagram of the waveguide pattern of such a matrix switch using directional couplers, the active portion 132 of the waveguides being shown by thicker black lines. The indication of connection paths by letter codes follows the format used for FIG. 2.

This prior art switch has several advantages: (1) it reduces the switch rank from standard 2N−1 to N (the switch matrix dimension is N×N); (2) all connection paths have the same number of crosspoints; (3) it is a strictly nonblocking architecture in which every connection path can be set up by activating one crosspoint and can be free of interruption. The first advantage allows either reducing the switch drive voltage or increasing the matrix dimension on a single array chip. The second advantage allows uniform optical loss for all connection paths. The third advantage offers easy control and prevention of data loss. In fact, Sawaki, et al reported a 4×4 matrix switch (using reverse $\Delta\beta$ directional couplers), similar to that of FIG. 2, which has a drive voltage of 11 V and ar average insertion loss of 4.7 dB with deviations for different paths within ±0.3 dB. The signal-to-crosstalk ratio (SXR) in this architecture is given by $$SXR = X_s - L_i - 10\log_{10}(N-1), (dB) \quad (1)$$

where $X_s$ and $L_i$ represent the switch element extinction ratio and the optical loss of a waveguide intersection (both in dB.) Their measurements showed $X_s \sim 15$ to $\sim 30$ dB (average $X_s = 24$ dB) and $L_i \sim 0.3$ dB, which represent the level that current processing technology can generally achieve with tight control.

From Eq. (1) one knows that, for a 8×8 matrix switch with SXR=20 dB, one has to use 2×2 changeover switches with $X_2 \leq 29$ dB, which is somewhat difficult to achieve in an integrated optical device, especially when more than 10 switch elements are fabricated on one chip.

SUMMARY OF THE INVENTION

A principal object of this invention is to provide a rectangular crossbar matrix switch with near-zero crosstalk which overcomes these problems of the prior art.

It is another object of this invention to provide a novel 2×2 shift switch with near zero crosstalk for use in an nxn integrated matrix switch.

It is a further object of the invention to provide such a matrix switch which can be easily manufactured with readily reproducible quality and performance.

In order to solve the problems described above and to achieve the objects of this invention, this invention provides a two-stage 3×3 shift switch which, when used as a 2×2 shift switch, has near zero crosstalk, and a hybrid matrix switch design that uses combinations of 2×2 changeover switches and 2×2 shift switches to build up rectangular crossbar matrix switches. This new matrix switch design has a greatly improved SXR at the expense of optical path loss. For a 8×8 matrix switch with SXR=20 dB, one needs to use reverse $\Delta\beta$ directional couplers or other 2×2 changeover switches with $X_s \geq 15$ dB only. The processing technology for such changeover switches automatically ensures production of the required 2×2 shift switches for the new hybrid matrix switch.

In a first aspect of the invention, an integrated two-stage 3×3 optical shift switch is provided by three optical waveguides and two electrodes. A first electrode is adjacent a first waveguide and a second electrode is adjacent a first section of a second waveguide in close proximity to said first waveguide, to form a 2×2 changeover switch as the first stage. The first electrode is also adjacent a second section of the second waveguide and the second electrode is adjacent the third waveguide in close proximity to said second waveguide, forming a 2×2 changeover switch which is the second stage. The two stages share the second waveguide and both electrodes. Each of the waveguides connects an input port to an output port. In the bar state optical signals pass straight through from an input port to the corresponding output port. In the shift state, an optical signal from an input port is shifted from a first waveguide to a second in each stage to reach the output port of a third waveguide. By terminating one input port and one output port in a substrate or a passive waveguide, a 2×2 shift switch is provided.

In a second aspect of the invention, an nxn hybrid optical switch matrix having n input ports and n output ports, and using conventional 2×2 changeover switches and the 2×2 shift switch of this invention is formed by an array of n rows and n columns wherein the outermost columns of change-over switches are connected to the input and output ports and the intermediate columns have 2×2 shift switches which have spurious optical absorbing terminations at the third input and output ports, thereby assuring very low crosstalk.

DETAILED DESCRIPTION

This invention pertains to non-blocking, low crosstalk, rectangularly configured crossbar switches employing integrated optical hybrid matrix switch designs.

The key element for the novel hybrid matrix switch of this invention is an integrated optical shift switch which is formed by uniting two identical 2×2 changeover switches, resulting in a switch having 3 input and 3 output ports.

Figure 4A:
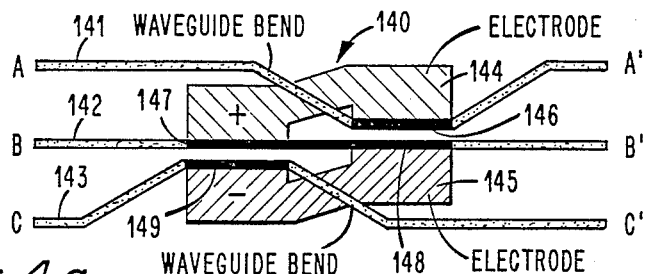
FIGS. 4a, 4b and 4c are diagrammatic views of integrated optical shift switches having three input and three output ports, using directional couplers, cross-switches and reverse $\Delta\beta$ directional couplers respectively.
Figure 4B:
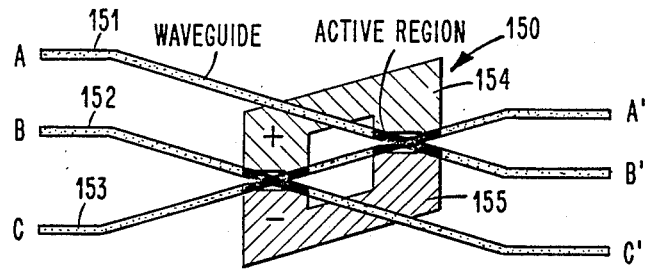
Figure 4C:
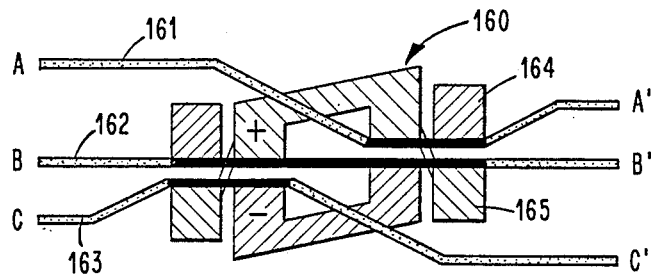

Referring to the drawings, FIGS. 4a, 4b and 4c illustrate three embodiments of the integrated optical shift switch of the present invention. The shift switch has two operational states, the "bar" state and the "shift" state. TABLE I shows the optical channels appearing at the output ports in the "bar" and "shift" states of the shift switch. These will be discussed below.

TABLE I

| Figure | Components of 3 × 3 Shift Switch | Optical Signal Input Port | Optical Signal Output Port Bar State | Optical Signal Output Port Shift State |
| --- | --- | --- | --- | --- |
| 4a | Directional Couplers | A | A' | B' |
|  |  | B | B' | C' |
|  |  | C | C' | A' |
| 4b | X-switches | A | A' | B' |
|  |  | B | B' | C' |
|  |  | C | C' | A' |
| 4c | Reverse $\Delta\beta$ Couplers | A | A' | B' |
|  |  | B | B' | C' |

TABLE I-continued

| Figure | Components of 3 × 3 Shift Switch | Optical Signal Input Port | Optical Signal Output Port Bar State | Optical Signal Output Port Shift State |
| --- | --- | --- | --- | --- |
|  |  | C | C' | A' |

FIG. 4a is a schematic diagram of one embodiment of the 3×3 integrated two-stage optical shift switch of the present invention. Shift switch 140 is a two-stage optical shift switch constructed from two 2×2 integrated optical changeover switches using directional couplers. Switch 140 is fabricated from three integrated waveguides, 141, 142 and 143 and two electrodes 144, 145 of opposite polarity. Integrated optical waveguides 141, 142, 143 have input ports A, B, C respectively and output ports A', B', C' respectively, at the opposite ends thereof. First electrode 144 of a first polarity is positioned adjacent to a portion 146 of first integrated waveguide 141, and a portion 147 of second integrated waveguide 142. Second electrode 145 is positioned adjacent a second portion 148 of second integrated waveguide 142 and a portion of 149 of third integrated waveguide 143. First portion 147 of second integrated waveguide 142 and portion 149 of third integrated waveguide 143, are positioned in close proximity to each other to enable optical signals to be transferred from one of said waveguides to the other under the control of said first and second electrodes, 144, 145 adjacent to said waveguides. The active region of said integrated waveguide portions 147, 149 together with said adjacent electrodes 144, 145 respectively form a first 2×2 switch in said two-stage integrated optical switch 140. Likewise, portion 146 of first integrated waveguide 141 and second portion 148 of second integrated waveguide 142 are in close proximity to form a second active region to enable optical signals to be transferred from one of said waveguides to the other under the control of adjacent first and second electrodes 144, 145, forming the second stage 2×2 switch of 3×3 switch 140. Thus, shift switch 140 is a combination of two individual switches sharing a common waveguide 142 and common electrodes 144, 145.

In FIG. 4b, a two-stage shift switch 150 is similarly configured from two cross switches, sharing a common waveguide 153. In the bar state, an optical signal entering on input ports A, B, C exits on the corresponding output A', B', C'. In the shift state, an optical signal entering on inputs A, B, or C exits on outputs B', C', or A' respectively.

In FIG. 4c, a preferred embodiment of a 3×3 two-stage optical shift switch 160 comprising two 2×2 switches uses reverse $\Delta\beta$ directional couplers for each stage. Shift switch 160 is configured similarly to switch 140 of FIG. 4a, except that the positive electrode 164 and the negative electrode 165 appear on both sides of the common waveguide 162. In the bar state, an optical signal on inputs A, B, or C appears on the corresponding output A', B', or C'. In the shift state, an optical signal on inputs A, B or C appears on output B', C', or A' respectively.

Figure 5:
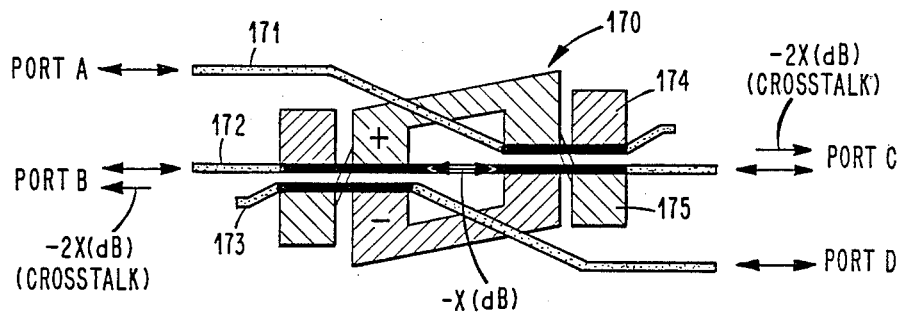
FIG. 5 is a diagrammatic view of an integrated optical shift switch of FIG. 4c used as a two input/two output switch.

In the present invention, the twostage integrated optical shift switch is used as a 2-input/2-output switch. FIG. 5 illustrates the preferred embodiment of FIG. 4c configured to operate a 2×2 shift switch. Integrated optical shift switch 170 of FIG. 5 is a bidirectional two-stage shift switch using reverse $\Delta\beta$ directional couplers, having four ports. In the shift state, an optical signal on ports A or B appears on ports C or D respectively. The remaining two ports of the 3×3 shift switch are not connected to any other active devices. Essentially these remaining waveguide ports can either simply terminate at the periphery of switch 170, whereby light is absorbed by the substrate, or be connected to additional passive waveguides that can guide the residual light out of the matrix.

In such an arrangement, the shift switch is a low crosstalk device when in its "shift" state. In its "shift" state there is absolutely no crosstalk for PORT A and PORT D, and a negligibly small crosstalk (denoted $-2X_s$ dB in FIG. 5) for the others (PORT B and PORT C). In its "shift" state, the insertion loss of a 2×2 shift switch for both connection paths is essentially equal to that of the 2×2 changeover switch, $L_s$. However, in the shift switch's "bar" state, the PORT B–PORT C connection has an insertion loss of $2L_s$, twice as large as that of the 2×2 changeover switch.

Figure 6:
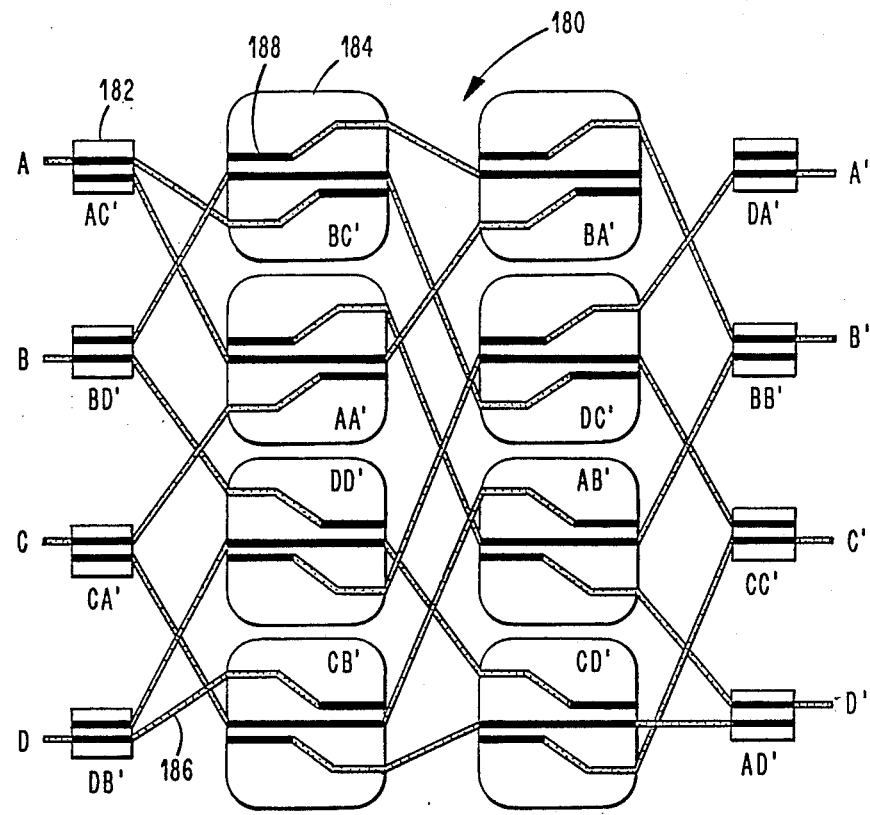
FIG. 6 is a diagram of the preferred embodiment of a low crosstalk rectangular crossbar hybrid matrix switch using the switches of FIGS. 1 and 5, according to the invention.

A preferred embodiment of the new hybrid matrix switch design 180 is shown in FIG. 6 for a 4×4 rectangular crossbar switch. Eight shift switches 184 and eight changeover switches 182 are interconnected by low-loss waveguide bends 186 to form the hybrid matrix switch 180. The angle of two intersecting waveguide 186 bends should be large enough (e.g., $\leq 8$ degrees) to ensure negligible loss and crosstalk caused by the intersection.

It should be noted that in the 4×4 hybrid matrix switch 180, only the switch elements that directly connect the input and output ports are 2×2 changeover switches 182, the others are 2×2 shift switches 184.

Figures 1A, 1B:
FIGS. 1a and 1b are diagrammatic views of the bar state and the cross state respectively of a typical 2×2 optical changeover switch.
Figure 2:
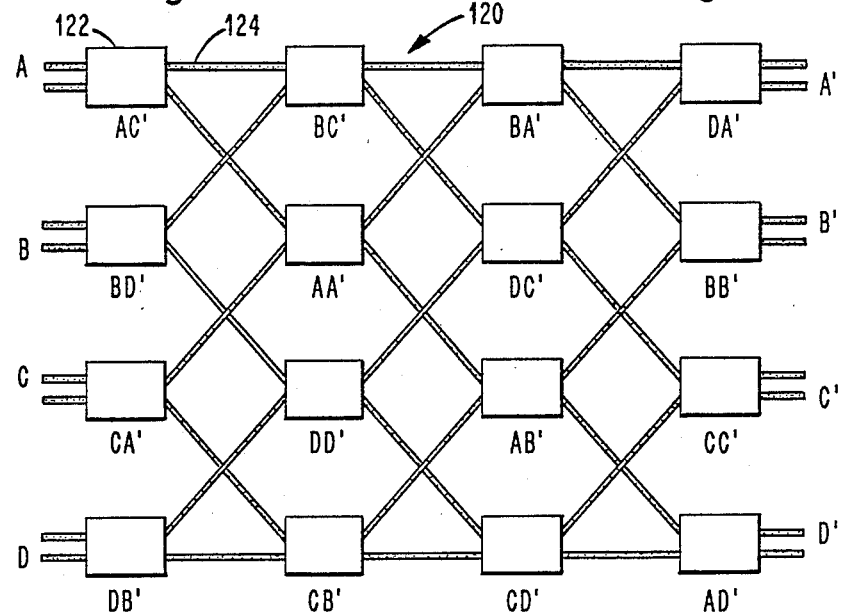
FIG. 2 is a diagram of a prior art crossbar matrix switch using 2×2 changeover switch elements.
Figure 3:
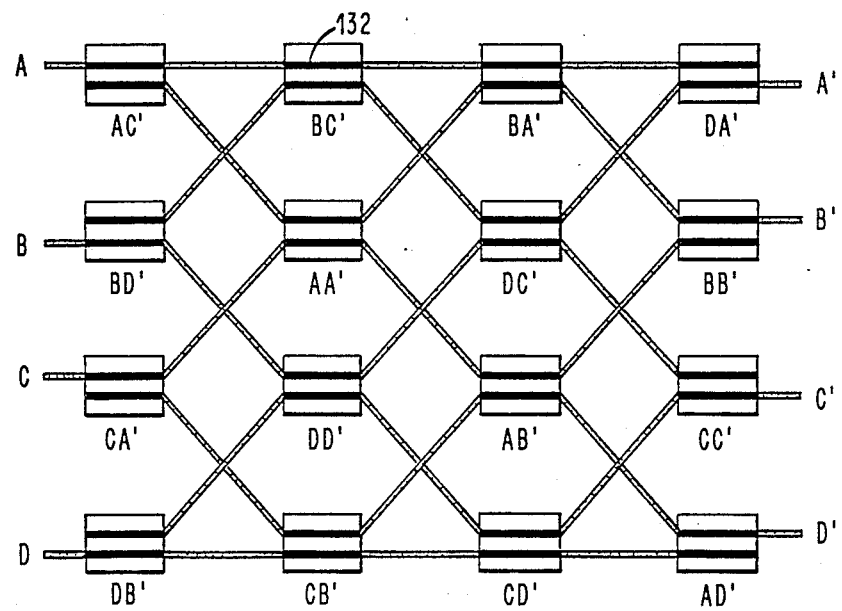
FIG. 3 is a diagram of a prior art crossbar matrix switch using directional coupler switches.

FIG. 6 also shows below each switch 182, 184, the switch elements which should be activated to set up corresponding connection paths, following the convention of FIG. 2. The hybrid crossbar matrix switch of FIG. 6 is similar to that of FIG. 2, but utilizes the integrated optical shift switch of the present invention in a hybrid matrix to achieve significantly less crosstalk, as explained supra. The nxn switch matrix consists of n rows and n columns of switches. Each switch in one column is connected to two switches in the next column, one in the same row and one in the adjacent row, if said row is the first or last row, or one in the previous adjacent row, and one in the next adjacent row, if said row is neither the first nor the last row.

Figure 7:
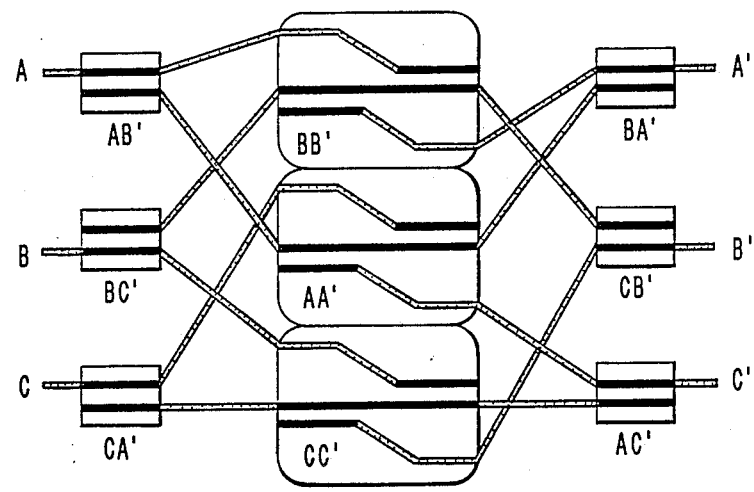
FIG. 7 is a diagram of a 3×3 hybrid matrix switch, according to the invention.
Figure 8:
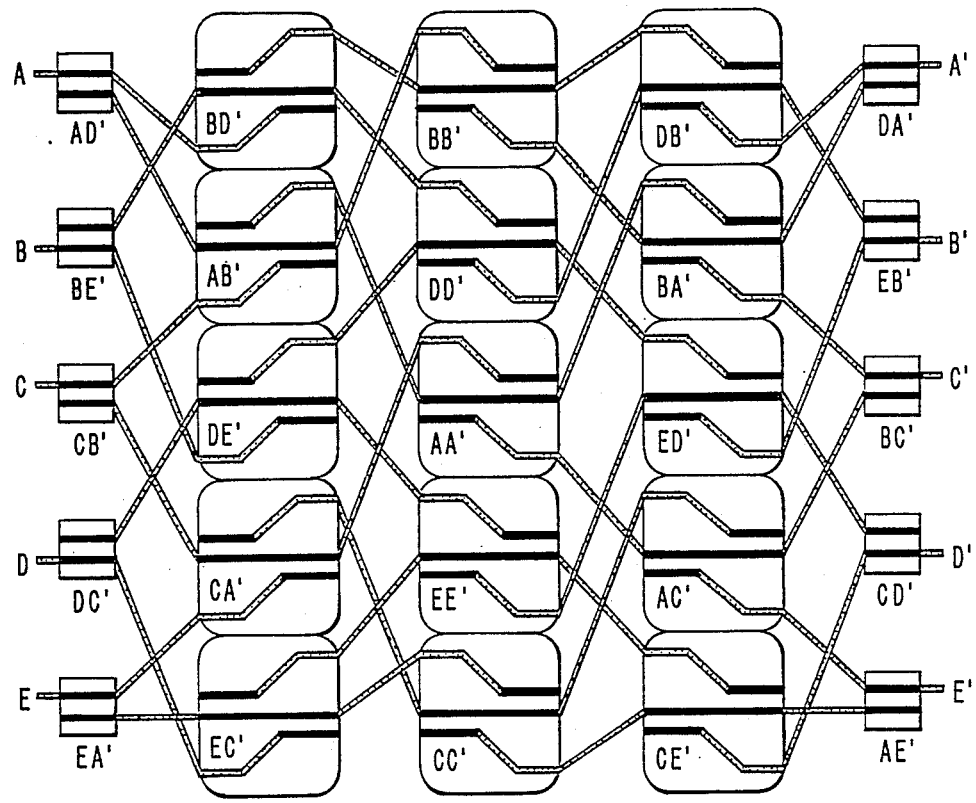
FIG. 8 is a diagram of a 5×5 hybrid matrix switch, according to the invention.

In general, for an nxn crossbar hybrid matrix switch, there are n input ports and n output ports. Hence, 2n 2×2 changeover switches 182 are required for coupling to the input and output ports. Since the total number of switches is $n^2$, then the number of shift switches 184 is $n^2-2n$. This rule is applied to design hybrid matrix switches with any other size. For example, 3×3 and 5×5 hybrid matrix switches are shown in FIG. 7 and FIG. 8, respectively.

Performance Estimates

Using the same analytical method used by Sawaki, the SXR for the new hybrid matrix switch is $$SXR = 2x_s - L_s - L_i - 10 \log 10(N-1), \quad (2)$$

where $X_s$ and $L_s$ are the extinction ratio and loss associated with the 2×2 changeover switches, and $L_i$ is the loss of the waveguide intersection. In detail, the worst-case SXR is obtained in a situation that the "signal" at the receiving end has a power level of $$P_s = P_{in} - (N+1)L_s - (2N-3)L_i - L_e, \quad (dB) \quad (3)$$

and the "crosstalk" from a different input port at the same receiving end has a power level of $$P_c = P_{in} - 2X_s - NL_s - (2N-4)L_i - L_e, \quad (dB) \quad (4)$$

where $P_{in}$ is the input optical signal power and $L_e$ is the excess loss including the propagation loss and the waveguide-fiber coupling loss. Eq. (2) is obtained by considering that there are $N-1$ possible crosstalk sources which will enter the connection path. Tables II and III illustrate the comparison of 3 different architectures for 4×4 and 8×8 cross bar matrix switches using reverse $\Delta\beta$ directional couplers in path loss and the requirements on drive voltage (relative) and the coupler extinction ratio $X_s$. In tabulating, it is assumed that SXR = 20 dB, $L_s = 0.5$ dB, and $L_i = 0.5$ dB.

Consider $L_s = 1$ dB and SXR = 20 dB in Eq. (2), a 8×8 rectangular crossbar switch using the hybrid matrix switch architecture requires $X_s \leq 15$ dB, which is 14 dB less than the 29-dB requirement with the prior art.

TABLE II

4 × 4 crossbar matrix switch with SXR = 20 dB, $L_s = 0.5$ dB, and $L_i = 0.5$ dB.

| | Standard Crossbar | Rectangular Crossbar | Hybrid Rectangular Crossbar |
|---|---|---|---|
| Number of couplers in path | 1–7 | 4 | 4–5 |
| Number of intersections in path | 0 | 1–3 | 3–5 |
| Path-dependent loss deviation | $\sim 6L_s$ ($\sim 3$dB) | $\sim 2L_i$ ($\sim 1$dB) | $\sim L_s + L_i$ ($\sim 1$dB) |
| Required drive voltage (relative) | 1 | $\sim 0.6$ | $\sim 0.8$ |
| $X_s$ requirement (dB) | 26.3 | 25.3 | 13 |

TABLE III

8 × 8 crossbar matrix switch with SCR = 20 dB, $L_s = 0.5$ dB, and $L_i = 0.5$ dB.

| | Standard Crossbar | Rectangular Crossbar | Hybrid Rectangular Crossbar |
|---|---|---|---|
| Number of couplers in path | 1–15 | 8 | 8–9 |
| Number of intersections in path | 0 | 5–7 | 11–13 |
| Path-dependent loss deviation | $\sim 14L_s$ | $\sim 2L_i$ ($\sim 1$dB) | $\sim L_s + L_i$ ($\sim 1$dB) |
| Relative drive voltage | 1 | 0.6 | $\sim 1$ |
| $X_s$ requirement (dB) | 31 | 29 | 15 |

Alternatives or Extensions

The 2×2 shift switches for the present invention can be designed by using reverse $\Delta\beta$ directional couplers, X-switches, mode-sorting switches, conventional directional coupler switches, or any other types of integrated optical 2×2 changeover switches.

The matrix size of the hybrid matrix switch can be 3×3, 4×4, 5×5, ..., N×N where N is limited by factors such as the length of individual switch elements, the switch drive voltage, the power budget of the matrix switch, etc.

The new hybrid matrix switch can be implemented on any material systems suitable for integrated optics, for example, lithium niobate, III-V compound semiconductors, silica glass, organic polymers, etc.

The new hybrid matrix switch can be extended from using electrooptic effect as the control mechanism to using other mechanisms such as thermal, magnetooptic, and nonlinear effects on optical materials.

New Features

The hybrid matrix switch of the present invention has a significant improvement in the signal-to-crosstalk ratio (SXR) over the prior art using the same fabrication process; thereby easing the stringent requirement on the switch extinction ratio and/or allowing better performance. This new feature is expected to ease the tight processing control which, in turn, could give a higher fabrication yield and a reduced cost.

I claim:

1. An integrated two-stage optical shift switch comprising: a substrate;
three optical waveguides formed on said substrate;
a set of electrodes positioned on said substrate; a first one of said electrodes being positioned adjacent a first one of said waveguides and a second one of said electrodes being positioned adjacent a second one of said waveguides to form a first active region of said switch;
said first one of said electrodes also being positioned adjacent a second one of said waveguides and said second one of said electrodes also being positioned adjacent a third one of said waveguides to form a second active region of said switch;
each stage of said switch having one of said three waveguides in common;
three input ports;
three output ports;
each of said waveguides coupling one of said input ports to one of said output ports;
both of said active regions enabling optical signals to be transferred synchronously from one waveguide to the other under the control of a single voltage or a single set of voltages on said electrodes;
said active region selectively operable in a first mode such that said switch operates in a bar state in which an optical input signal entering at an input port of a waveguide is passed through said waveguide and exits the corresponding output port of said waveguide; and said active region selectively operable in a second mode such that said switch operates in a shift state whereby an optical signal on a first waveguide is shifted to a second waveguide in said first stage and an optical signal on a second waveguide is shifted to a third waveguide in a second stage, said shifting occurring simultaneously.

2. The switch of claim 1 wherein said switch is formed from directional couplers.

3. The switch of claim 1 wherein said switch is formed from cross switches.

4. The switch of claim 1 wherein said switch is formed from reverse delta-beta directional couplers.

5. The optical shift switch of claim 1 wherein:
one of said input ports and one of said output ports are terminated in said substrate, thereby serving to absorb non-addressed and spurious optical signals, resulting in very low crosstalk in the shift state; and
said shift switch serves as a $2 \times 2$ shift switch in which each stage is equivalent to a $2 \times 2$ cross switch.

6. The optical shift switch of claim 1, wherein:
one of said input ports and one of said output ports are connected to passive waveguides that serve to guide non-addressed and spurious optical signals out of the switch.

7. An optical switch array having n input ports and n output ports for selectively connecting one of said n input ports to one of said n output ports, such connections establishing a pair, with from one to n pairs selectably operable simultaneously, comprising:
$n^2$ optical switches arranged in an nxn matrix;
2n of said $n^2$ optical switches being $2 \times 2$ optical changeover switches and $n^2 - 2n$ of said switches being optical shift switches;
each of said 2n optical $2 \times 2$ changeover switches being coupled to one of said input/output ports by a low-loss optical waveguide;
each of said $n^2 - 2n$ optical shift switches being a two-stage $3 \times 3$ optical switch connected intermediate said $2 \times 2$ changeover switches and used as a 2-input/2-output switch, said third ports serving essentially as spurious light collectors;
said optical shift switches and said optical crossover switches being connected by low-loss waveguide bends to form a hybrid matrix switch with a path from each of said n input ports to each of said n output ports.

8. An optical switch array having n input ports and n output ports for selectively coupling one of said input ports to one of said output ports, such coupling establishing a pair, with from one to n pairs selectably operable simultaneously, comprising:
$n^2$ optical switches, including:
2n first switching means operable in a first mode and a second mode, having two inputs and two outputs for switchably coupling one of said inputs to one of said outputs, an input coupled directly to its corresponding output in its first mode and an input coupled to the other of said outputs in its second mode;
$n^2 - 2n$ second optical switching means selectably operable in a first mode and a second mode, having first, second and third inputs and first, second and third outputs, two of said three input ports being selectably coupled to two of said three output ports for switchably coupling one of said input ports directly to its corresponding output port in a first mode and for switchably shifting one of said input ports to a different one of said output ports in a second mode;
said matrix comprising:
a first column of n first optical switching means, each of which is coupled to said n input ports by low-loss optical waveguides;
n−2 columns of n second optical switching means, each of which is coupled to two optical switches in each of two adjacent columns, one in the same row and one in an adjacent row if said row is either the first or the last rows, one in the previous adjacent row and one in the next adjacent row if said row is neither the first nor the last rows, by low-loss optical waveguide bends;
a second column of n first optical switching means, each of which is coupled to two second optical switching means at its input and to one of said n output ports its output side; such that an optical signal on any one of said input ports may be switched to any one of said output ports by selectably activating one switch in each of said columns; and
whereby each of said second switching means provides spurious optical signal absorbing terminations at the third ports of each.

9. The optical switch array of claim 8 further including:
n rows of said optical switches, wherein each row comprises sequentially a first changeover switch, n−2 shift switches and a second changeover switch.

10. The optical switch array of claim 8 wherein said first switching means are optical changeover switches.

11. The optical switch array of claim 8 wherein said second switching means are two-stage optical shift switches.

* * * * *